US012563594B2

(12) United States Patent
Ganesan et al.

(10) Patent No.: US 12,563,594 B2
(45) Date of Patent: Feb. 24, 2026

(54) USING A STOP INDICATION FOR PHYSICAL UPLINK SHARED CHANNEL TRANSMISSION

(71) Applicant: Lenovo (Singapore) PTE. LTD., New Tech Park (SG)

(72) Inventors: Karthikeyan Ganesan, Kronberg im Taunus (DE); Ankit Bhamri, Rödermark (DE); Alexander Johann Maria Golitschek Edler von Elbwart, Darmstadt (DE); Ali Ramadan Ali, Kraiburg am Inn (DE); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 496 days.

(21) Appl. No.: 17/914,697

(22) PCT Filed: Mar. 25, 2021

(86) PCT No.: PCT/IB2021/052504
§ 371 (c)(1),
(2) Date: Sep. 26, 2022

(87) PCT Pub. No.: WO2021/191847
PCT Pub. Date: Sep. 30, 2021

(65) Prior Publication Data
US 2023/0128924 A1      Apr. 27, 2023

Related U.S. Application Data

(60) Provisional application No. 63/000,028, filed on Mar. 26, 2020.

(51) Int. Cl.
*H04W 74/0816*      (2024.01)
*H04W 16/28*      (2009.01)
(Continued)

(52) U.S. Cl.
CPC ....... *H04W 74/0816* (2013.01); *H04W 16/28* (2013.01); *H04W 72/1268* (2013.01); *H04W 74/006* (2013.01)

(58) Field of Classification Search
CPC ............. H04W 74/0816; H04W 16/28; H04W 72/1268; H04W 74/006
See application file for complete search history.

(56) References Cited

U.S. PATENT DOCUMENTS

| | | | |
|---|---|---|---|
| 10,959,263 B2 * | 3/2021 | Naghshvar ........... | H04B 7/0695 |
| 2012/0044826 A1 * | 2/2012 | Wang .................... | H04L 5/0053 370/252 |

(Continued)

FOREIGN PATENT DOCUMENTS

| | | |
|---|---|---|
| CN | 110830220 A | 2/2020 |
| WO | 2019173365 A1 | 12/2019 |

(Continued)

OTHER PUBLICATIONS

Ankith Reddy, Clear to to Send (RTS)\n, Jul. 30, 2019, tutorialpoint. com link. A pdf copy is provided with the office action.*

(Continued)

*Primary Examiner* — Charles C Jiang
(74) *Attorney, Agent, or Firm* — Kunzler Needham & Hilton

(57) ABSTRACT

Apparatuses, methods, and systems are disclosed for using a stop indication for physical uplink shared channel transmission. One method includes transmitting a physical uplink shared channel transmission in an autonomous uplink configured grant resource after performing a listen-before-talk procedure. In various embodiments, the method includes receiving a stop indication in response to transmitting the physical uplink shared channel transmission, wherein the stop indication indicates for a group of user equipments not (Continued)

to transmit in an overlapped configured grant resource for a period of time corresponding to a spatial filter.

20 Claims, 6 Drawing Sheets

(51) Int. Cl.
H04W 72/1268 (2023.01)
H04W 74/00 (2009.01)

(56) References Cited

U.S. PATENT DOCUMENTS

| | | | | |
|---|---|---|---|---|
| 2012/0252447 A1* | 10/2012 | Sartori | .................. | H04W 24/10 |
| | | | | 455/434 |
| 2012/0252487 A1* | 10/2012 | Siomina | ................ | H04W 24/10 |
| | | | | 455/456.1 |
| 2012/0281566 A1* | 11/2012 | Pelletier | ................ | H04W 76/27 |
| | | | | 370/252 |
| 2017/0105224 A1* | 4/2017 | Ghanbarinejad | ... | H04W 72/542 |
| 2017/0171723 A1 | 6/2017 | Adachi | | |
| 2019/0166503 A1 | 5/2019 | Ahn et al. | | |
| 2019/0253197 A1* | 8/2019 | Babaei | .................... | H04L 1/188 |
| 2020/0053721 A1 | 2/2020 | Cheng et al. | | |
| 2021/0376985 A1* | 12/2021 | Zhou | ................ | H04W 72/1268 |

FOREIGN PATENT DOCUMENTS

| | | | | |
|---|---|---|---|---|
| WO | 2020033689 A1 | 2/2020 | | |
| WO | WO-2020206164 A1 * | 10/2020 | ............ | H04W 72/23 |

OTHER PUBLICATIONS

"Discussion on Configured Grant for NR-U", Source ZTE, published: Nov. 2018 (See IDS, filed Sep. 26, 2022).*

ZTE, Discussion on configured grant for NR-U, 3GPP TSG RAN WG1 Meeting #95 R1-1812438, Nov. 12-16, 2018, p. 1-5.

Fujitsu, Discussion on UL cancellation indication, 3GPP TSG RAN WG1 #97 R1-1906585, May 13-17, 2019, p. 1-4.

Intel Corporation, New SID: Study on supporting NR from 52.6GHz to 71 GHz, 3GPP TSG RAN Meeting #86 RP-193259, Dec. 9-12, 2019, p. 1-3.

PCT/IB2021/052504, "Notification of Transmittal of the International Search Report and the Written Opinion of the International Searching authority, or the Declaration", International Searching Authority, Jul. 1, 2021, pp. 1-15.

* cited by examiner

200

300

400

| Field | Bit width | |
|---|---|---|
| | 1 transport block | 2 transport blocks |
| AUL C-RNTI | 16 | 16 |
| HARQ process number | 4 | 4 |
| Redundancy version | 2 | 2 |
| New data indicator | 1 | 2 |
| PUSCH starting symbol | 1 | 1 |
| PUSCH ending symbol | 1 | 1 |
| Channel Occupancy Time (COT) sharing indication | 1 | 1 |

500

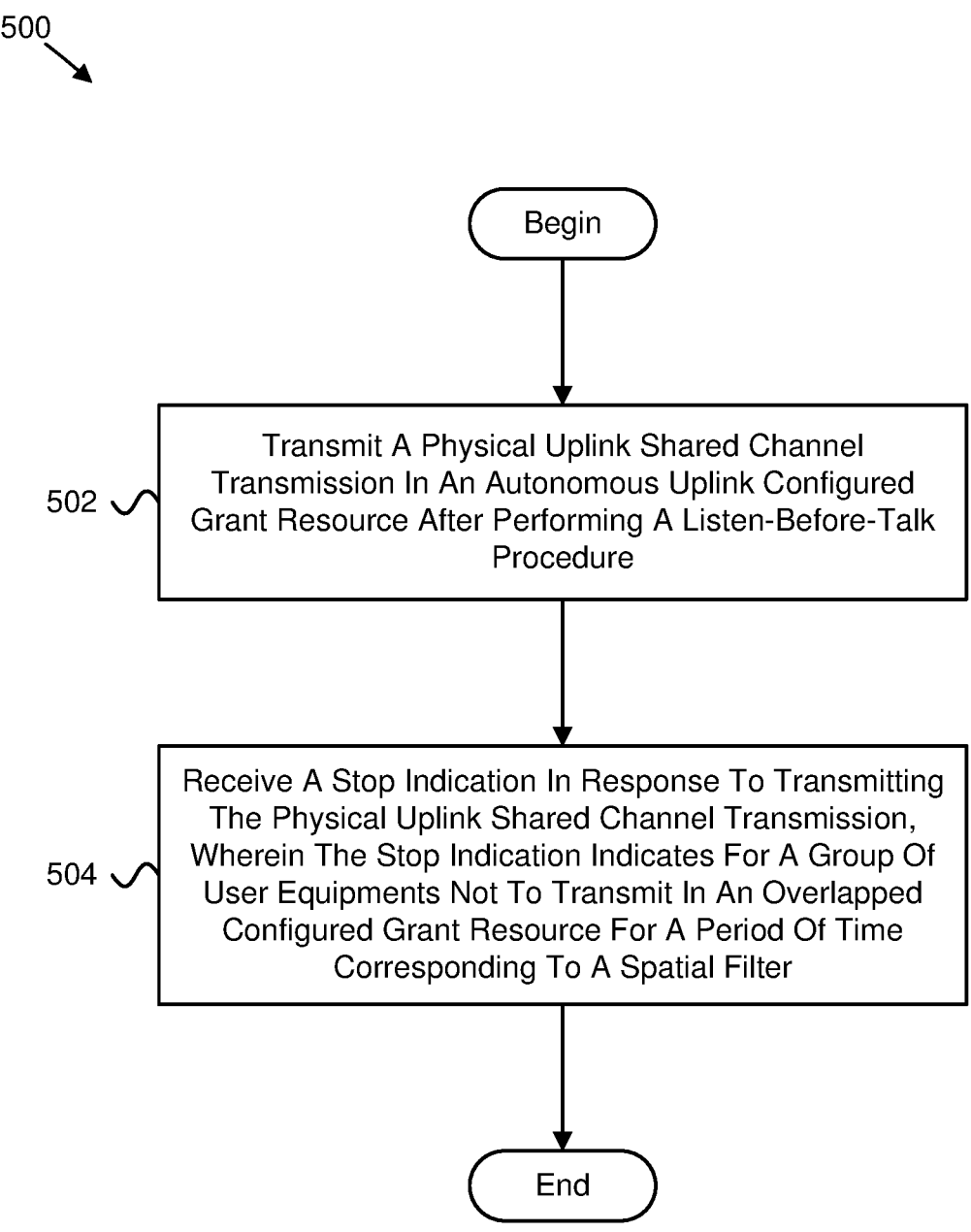

Begin

502

Transmit A Physical Uplink Shared Channel Transmission In An Autonomous Uplink Configured Grant Resource After Performing A Listen-Before-Talk Procedure

504

Receive A Stop Indication In Response To Transmitting The Physical Uplink Shared Channel Transmission, Wherein The Stop Indication Indicates For A Group Of User Equipments Not To Transmit In An Overlapped Configured Grant Resource For A Period Of Time Corresponding To A Spatial Filter End

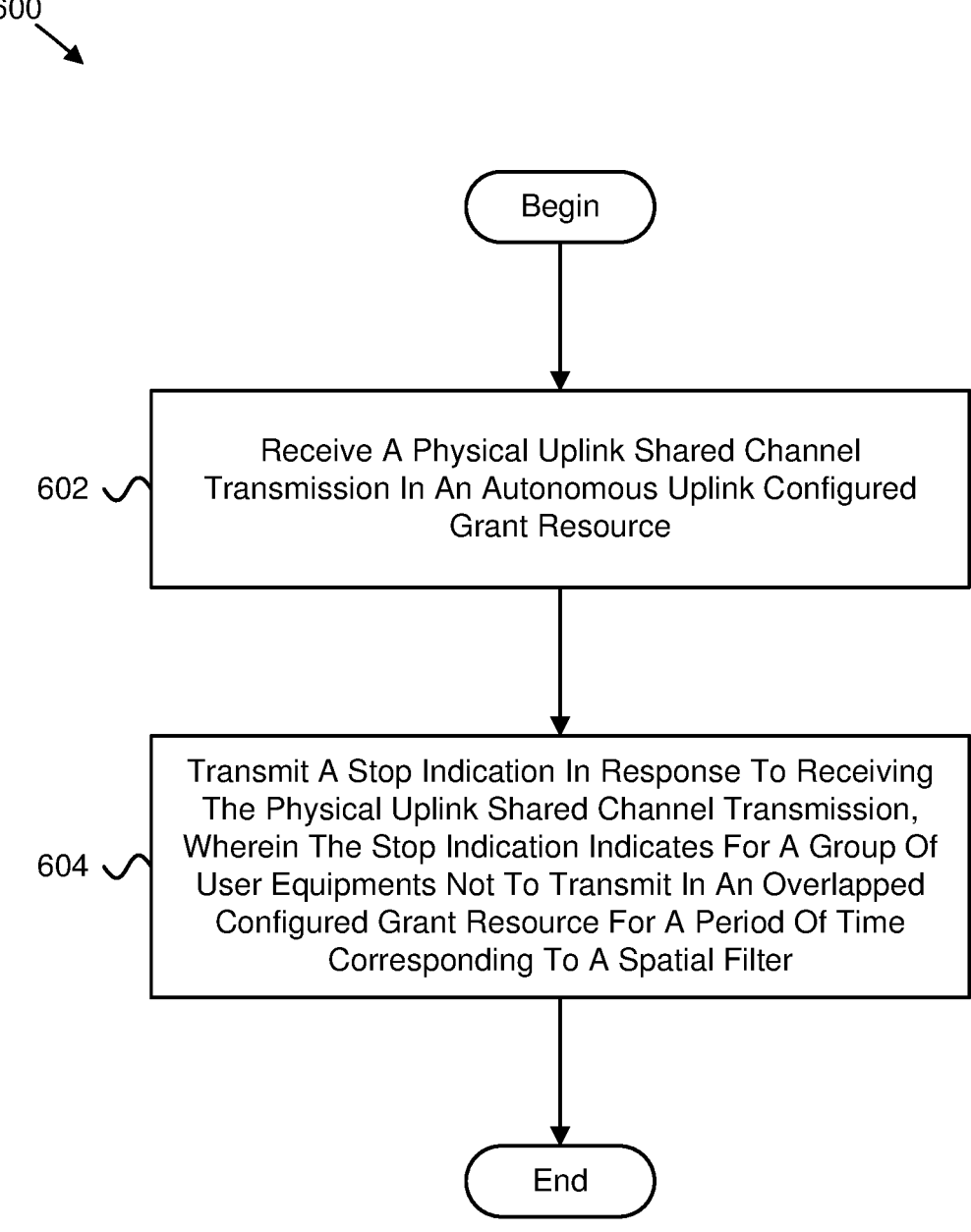

Begin

602 · Receive A Physical Uplink Shared Channel Transmission In An Autonomous Uplink Configured Grant Resource 604 · Transmit A Stop Indication In Response To Receiving The Physical Uplink Shared Channel Transmission, Wherein The Stop Indication Indicates For A Group Of User Equipments Not To Transmit In An Overlapped Configured Grant Resource For A Period Of Time Corresponding To A Spatial Filter End

FIG. 6

USING A STOP INDICATION FOR PHYSICAL UPLINK SHARED CHANNEL TRANSMISSION

CROSS-REFERENCE TO RELATED APPLICATIONS

This application claims priority to U.S. Patent Application Ser. No. 63/000,028 entitled "APPARATUSES, METHODS, AND SYSTEMS FOR CONFIGURED GRANT PROCEDURE FOR SPATIAL LBT" and filed on Mar. 26, 2020 for Karthikeyan Ganesan, which is incorporated herein by reference in its entirety.

FIELD

The subject matter disclosed herein relates generally to wireless communications and more particularly relates to using a stop indication for physical uplink shared channel transmission.

BACKGROUND

In certain wireless communications networks, interference between signals of different devices may be compounded with unnecessary transmissions.

BRIEF SUMMARY

Methods for using a stop indication for physical uplink shared channel transmission are disclosed. Apparatuses and systems also perform the functions of the methods. One embodiment of a method includes transmitting a physical uplink shared channel transmission in an autonomous uplink configured grant resource after performing a listen-before-talk procedure. In various embodiments, the method includes receiving a stop indication in response to transmitting the physical uplink shared channel transmission, wherein the stop indication indicates for a group of user equipments not to transmit in an overlapped configured grant resource for a period of time corresponding to a spatial filter.

One apparatus for using a stop indication for physical uplink shared channel transmission includes a transmitter that transmits a physical uplink shared channel transmission in an autonomous uplink configured grant resource after performing a listen-before-talk procedure. In various embodiments, the apparatus includes a receiver that receives a stop indication in response to transmitting the physical uplink shared channel transmission, wherein the stop indication indicates for a group of user equipments not to transmit in an overlapped configured grant resource for a period of time corresponding to a spatial filter.

In certain embodiments, a method for using a stop indication for physical uplink shared channel transmission includes receiving a physical uplink shared channel transmission in an autonomous uplink configured grant resource. In various embodiments, the method includes transmitting a stop indication in response to receiving the physical uplink shared channel transmission, wherein the stop indication indicates for a group of user equipments not to transmit in an overlapped configured grant resource for a period of time corresponding to a spatial filter.

In some embodiments, an apparatus for using a stop indication for physical uplink shared channel transmission includes a receiver that receives a physical uplink shared channel transmission in an autonomous uplink configured grant resource. In various embodiments, the apparatus includes a transmitter that transmits a stop indication in response to receiving the physical uplink shared channel transmission, wherein the stop indication indicates for a group of user equipments not to transmit in an overlapped configured grant resource for a period of time corresponding to a spatial filter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5 is a flow chart diagram illustrating one embodiment of a method for using a stop indication for physical uplink shared channel transmission; and FIG. 6 is a flow chart diagram illustrating another embodiment of a method for using a stop indication for physical uplink shared channel transmission.

DETAILED DESCRIPTION

Figure 1:
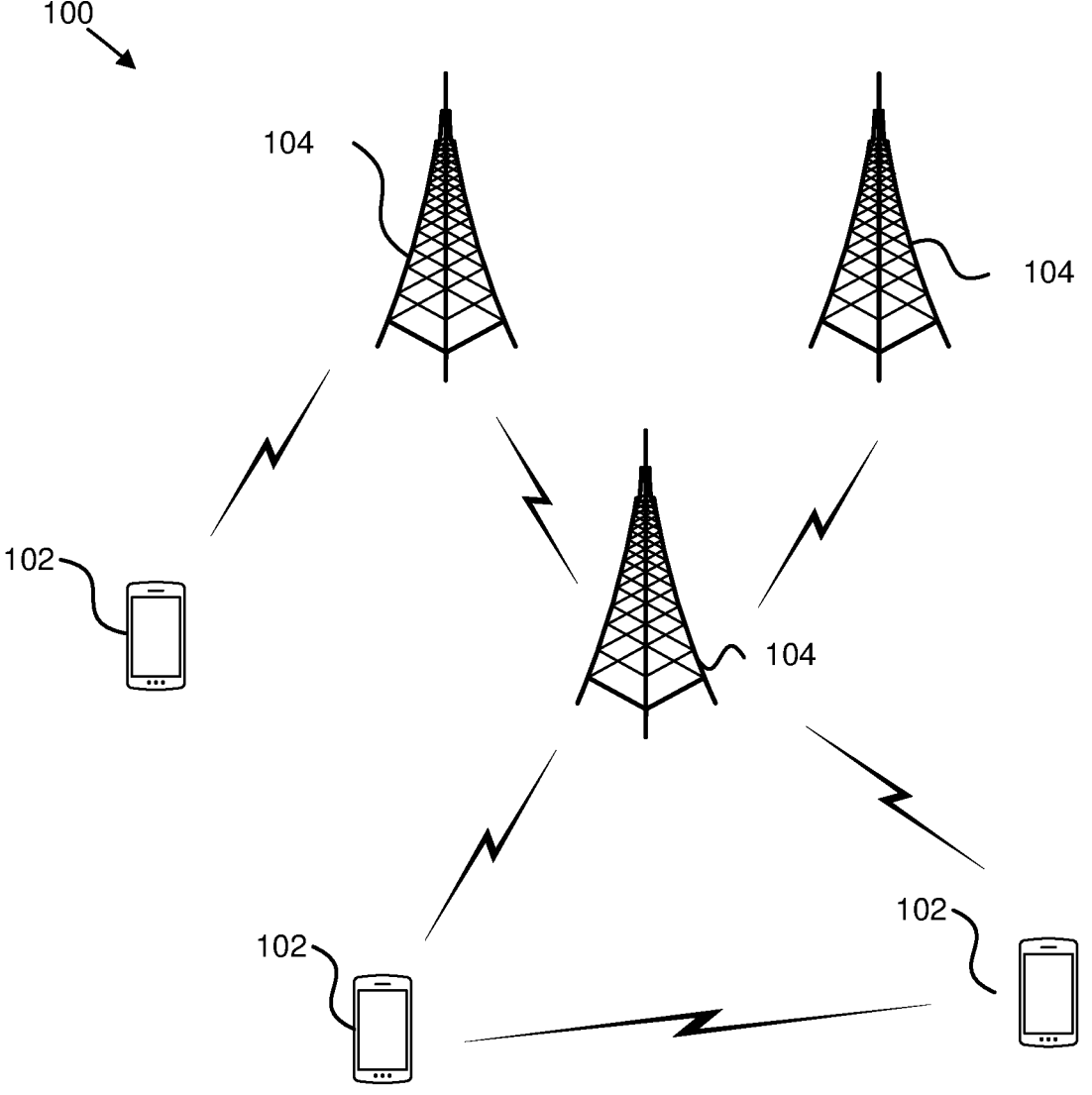
FIG. 1 is a schematic block diagram illustrating one embodiment of a wireless communication system for using a stop indication for physical uplink shared channel transmission.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for using a stop indication for physical uplink shared channel transmission. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, user equipment ("UE"), user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may transmit a physical uplink shared channel transmission in an autonomous uplink configured grant resource after performing a listen-before-talk procedure. In certain embodiments, the remote unit 102 may receive a stop indication in response to transmitting the physical uplink shared channel transmission. The stop indication indicates for a group of user equipments not to transmit in an overlapped configured grant resource for a period of time corresponding to a spatial filter. Accordingly, the remote unit 102 may be used for using a stop indication for physical uplink shared channel transmission.

In some embodiments, a network unit 104 may receive a physical uplink shared channel transmission in an autonomous uplink configured grant resource. In various embodiments, the network unit 104 may transmit a stop indication in response to receiving the physical uplink shared channel transmission. The stop indication indicates for a group of user equipments not to transmit in an overlapped configured grant resource for a period of time corresponding to a spatial filter. Accordingly, the network unit 104 may be used for using a stop indication for physical uplink shared channel transmission.

Figure 2:
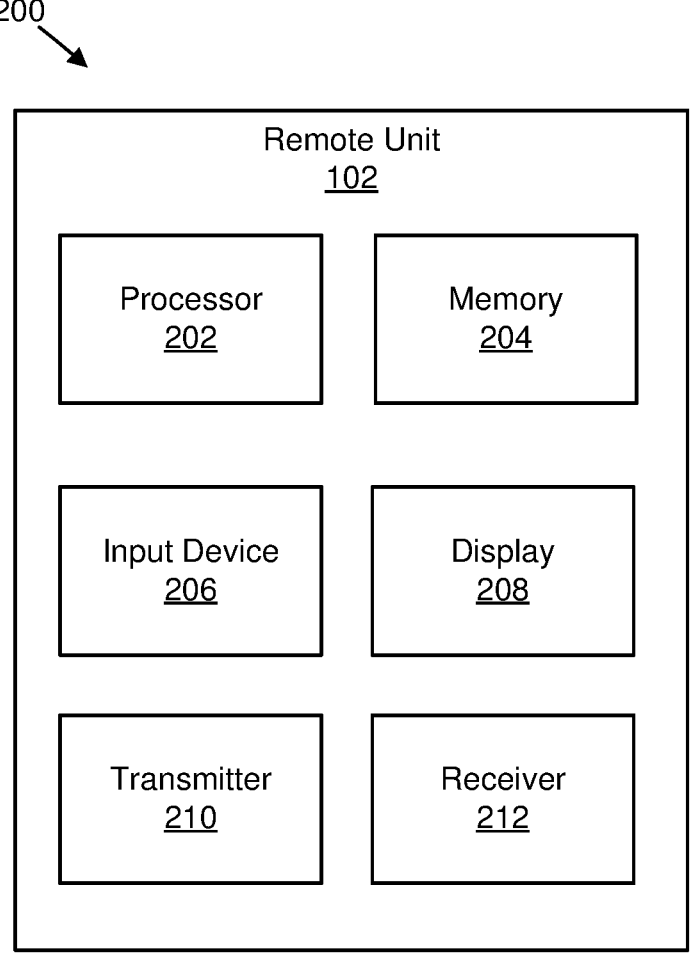
FIG. 2 is a schematic block diagram illustrating one embodiment of an apparatus that may be used for using a stop indication for physical uplink shared channel transmission.

FIG. 2 depicts one embodiment of an apparatus 200 that may be used for using a stop indication for physical uplink shared channel transmission. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiment, the transmitter 210 transmits a physical uplink shared channel transmission in an autonomous uplink configured grant resource after performing a listen-before-talk procedure. In various embodiments, the receiver 212 receives a stop indication in response to transmitting the physical uplink shared channel transmission. The stop indication indicates for a group of user equipments not to transmit in an overlapped configured grant resource for a period of time corresponding to a spatial filter.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
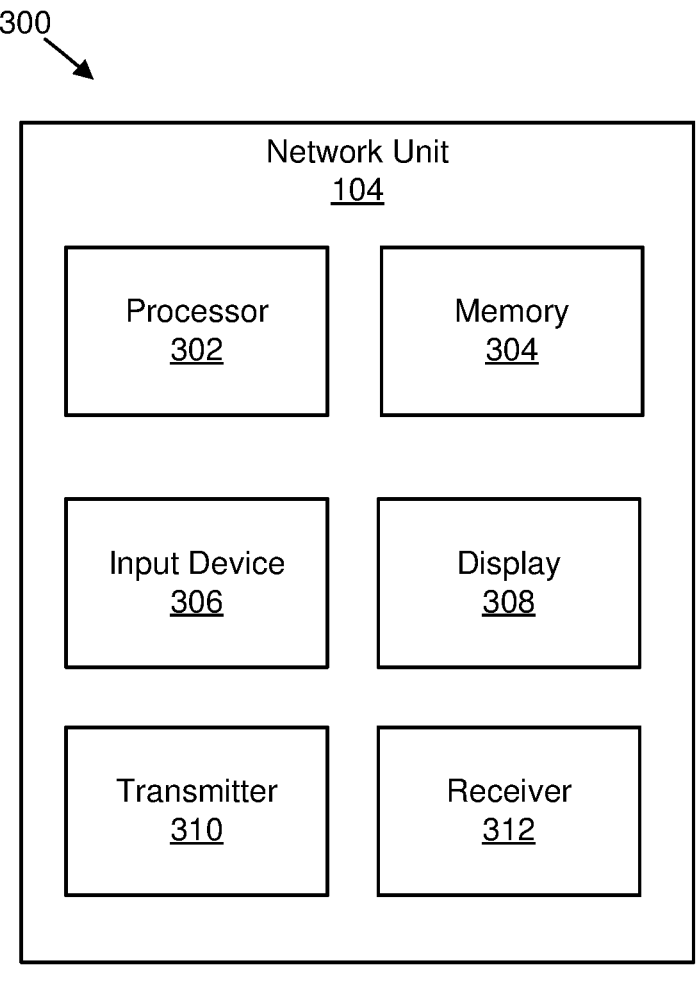
FIG. 3 is a schematic block diagram illustrating one embodiment of an apparatus that may be used for using a stop indication for physical uplink shared channel transmission.

FIG. 3 depicts one embodiment of an apparatus 300 that may be used for using a stop indication for physical uplink shared channel transmission. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the receiver 312 receives a physical uplink shared channel transmission in an autonomous uplink configured grant resource. In various embodiments, the transmitter 310 transmits a stop indication in response to receiving the physical uplink shared channel transmission. The stop indication indicates for a group of user equipments not to transmit in an overlapped configured grant resource for a period of time corresponding to a spatial filter.

In various embodiments, interference mitigation for UL channel access in unlicensed band for high frequency range (e.g., 24.25 GHz to 52.6 GHz ("FR2") or 52.6 GHz to 71 GHz ("FR4")) may be used. In some embodiments, beam-based transmission may be used for unlicensed spectrum in FR2 and beyond, and interferers such as Wi-Fi access points and/or other NR networks working at these bands may have directional transmission. In certain embodiments, performing listen before talk ("LBT") only for a TX UE may not guarantee free-of-interference reception due to nodes hidden to the TX UE. In various embodiments, there may be gNB assistance for interference free UL reception.

In some embodiments, such as in new radio unlicensed ("NR-U"), channel access in both downlink and uplink may rely on LBT. In such embodiments, a gNB and/or a UE senses a channel to find out if there is on-going communication prior to any transmission. In various embodiments, if a communication channel is a wide bandwidth unlicensed carrier, a clear channel assessment ("CCA") procedure may rely on detecting an energy level on multiple sub-bands of the communications channel. In certain embodiments, no beamforming may be used for LBT in NR-U and only omni-directional LBT may be used.

Figure 4:
FIG. 4 is a diagram illustrating one embodiment of a table including fields for AUL-UCI.

In certain embodiments, the NR-U LBT procedures for channel access may be performed as follows: 1) both gNB-initiated and UE-initiated COTs may use category 4 LBT if the start of a new transmission burst always performs LBT with exponential backoff (e.g., with the exception that if a DRS must be at most one ms in duration and is not multiplexed with unicast physical downlink shared channel ("PDSCH")); and 2) UL transmissions within a gNB initiated COT or a subsequent DL transmission within a UE or gNB initiated COT may transmit immediately without sensing if a gap from the end of the previous transmission is not more than 16 μs (e.g., otherwise category 2 LBT must be used and the gap cannot exceed 25 μs). FIG. 4 illustrates one embodiment of fields 400 for autonomous uplink control information ("AUL-UCI") and corresponding bit widths.

In some embodiments, ready to send ("RTS") and/or clear to send ("CTS") may be used for CG transmission if a gNB transmits a stop indicator in groupcast ("GC") downlink control information ("DCI") based on a request message from a UE or based on an autonomous uplink ("A-UL") transmission. In such embodiments, the stop indicator transmitted to a group of UEs using groupcast downlink control information ("GC-DCI") may contain information about a time-frequency resource grid and a bitfield may be used to stop any UL transmission on CG resources overlapping with the indicated time-frequency resource grid. Moreover, in such embodiments, a duration for muting the indicated time-frequency resources may be in terms of slots, symbols, UL to DL, end of frame, and/or remaining channel occupancy duration. In one embodiment, a separate unicast ("UC") DCI is transmitted to a requesting UE as a clear to send command and, in another embodiment, the clear to send command may be part of the GC-DCI. In various embodiments, a timer may be used to monitor a stop indicator and/or clear to send reception. In certain embodiments, spatial filter information may be included in GC-DCI to facilitate that other group UEs do not transmit CG resources using the indicated spatial filter. In some embodiments that involve multiple panel transmission and/or multiple beam transmission of a request message, A-UL transmissions may be used.

In some embodiments, a gNB stops a configured grant transmission during a remaining channel occupancy time ("COT") in COT sharing. In various embodiments, a gNB may receive a UE initiated COT sharing indicator from a UE (e.g., requesting UE) in autonomous uplink control information ("A-UCI") with a corresponding A-UL in a CG resource.

In certain embodiments, a gNB may transmit an indicator in GC-DCI to all UEs (e.g., UE configured to monitor the GC-DCI) to stop and/or cancel further UL transmissions in the CG resources. In such embodiments, the indicator may be used to mute a duration of the CG resource, mute a UE ID of the requesting UE (e.g., that can transmit on the CG resource), mute a spatial filter corresponding to the requesting UE, mute TCI information corresponding to the requesting UE, and/or mute spatial relation information corresponding to the requesting UE. In various embodiments, an A-UCI field or MAC CE transmitted by a requesting UE may contain a field for a gNB to transmit a stop indicator for a group of UEs. In some embodiments, stop indicator transmission may be semi-statically configured based on a channel access priority class.

In various embodiments, GC-DCI includes a one bit flag, a time and frequency ("T/F") resource corresponding to a CG resource of a requesting UE, a UE ID and duration in time slots and/or symbols indicating a muting duration of the CG resource. In such embodiments, the duration may be a remaining channel occupancy period, a UE may use a duration that is until the next UL to DL slot, the duration may extend until an end of a frame period. In certain embodiments, GC-DCI may contain a spatial filter, TCI information, and/or spatial relation information for which muting of CG resource is applicable.

In some embodiments, a one bit flag in a GC-PDCCH DCI format may inform a group of UEs to mute and/or stop transmission in partially or fully overlapped T/F resource with that of the requesting UE. In such embodiments, a gNB may configure UEs with a new radio network temporary identifier ("RNTI") for monitoring GC-DCI and cyclic redundancy cycle ("CRC") of GC-DCI may be masked with the new RNTI.

In various embodiments, there may be no flag in DCI and a group of UEs, after receiving GC-DCI with the new RNTI, may mute or not transmit for a specified duration in an overlapped configured grant ("CG") resource.

In certain embodiments, if a GC-DCI field contains spatial filter, TCI information, and/or spatial relation information, then a group of UEs does not transmit in the specified CG resource using the specified and/or indicated spatial filter or using the same spatial domain transmission filter used for the reception of the reference signal ("RS") associated with the TCI-state information and/or spatial relation information.

In some embodiments, a gNB, after receiving an A-UCI field or MAC control element ("CE") transmitted by a requesting UE, may transmit GC-DCI via downlink to all UEs. In various embodiments, a stop indicator transmitted by a gNB may be semi-statically configured based on a channel access priority class. In certain embodiments, a gNB may transmit GC-DCI and/or UCI-DCI using the same spatial filter used to receive an initial request message or A-UL (e.g., if SRS is used as a RS associated with TCI-state information and/or spatial relation information), or using the same spatial transmission filter used for transmission of the RS associated with the TCI-state information and/or spatial relation information used by a requesting UE to transmit an initial request message or A-UL. In such embodiments, the gNB may transmit GC-DCI in neighboring beams and/or using other spatial transmission filters.

In various embodiments, a UE, after receiving GC-DCI with its UE ID, may transmit in a CG resource for a specified duration and in a specified spatial filter.

In some embodiments, GC-DCI may include multiple cancel, muting, and/or clear-to-send indicators corresponding to the same and/or different requesting UEs associated with different time and/or frequency resources and/or received with different spatial reception filters, beams, antenna panels, and/or sub-arrays.

In certain embodiments, a gNB may transmit two DCIs, one GC-DCI to all UEs to stop further UL transmission in CG resources and a unicast DCI to inform a requesting UE of a clear to transmit command containing a UE ID, a duration of transmission, and/or a specified spatial filter. In one example of such embodiments, the unicast DCI may indicate an updated spatial filter, TCI information, spatial relation information, and/or an SRS resource indicator the requesting UE is to use for subsequent transmissions. In another example, the requesting UE may use the same spatial transmission filter used for transmission of an initial request message or A-UL.

In various embodiments, such as if GC-DCI is received before UC-DCI, a requesting UE may start further UL transmissions in a CG resource only after receiving clear to transmit UC-DCI from a gNB.

In some embodiments, a UE starts a timer while transmitting in A-UL in a CG resource to a gNB and the timer may be stopped either receiving a stop indicator in GC-DCI or in UC-DCI. In various embodiments, if a UE does not receive GC-DCI and/or UCI-DCI then, after expiration of a timer, the UE starts transmission of a new transport block ("TB") in a CG resource using the same or different beam and/or panel retransmit the same TB in the CG resource using the same or different beam and/or panel. In certain embodiments, a UE includes a field in A-UCI and/or a medium access control control element ("MAC-CE") to transmit a stop indicator for every UL transmission until the UE receives GC-DCI from a gNB.

In some embodiments, a UE transmits data using multiple beams, panels, and/or autonomous uplink ("AUL") resources.

In various embodiments, a UE transmits A-UL in CG resources using multiple beams and/or panels if Cat 4 LBT is successful and upon successful reception of UL data from any one of a beam and/or a panel. In such embodiments, a gNB may transmit a stop indicator in GC-DCI for all UEs and/or UC-DCI to a requesting UE. In certain embodiments, a gNB may transmit GC-DCI and/or UCI-DCI using the same spatial filter used to receive an initial request message or A-UL (e.g., if SRS is used as a RS associated with TCI-state information and/or spatial relation information), or using the same spatial transmission filter used for transmission of the RS associated with the TCI-state information and/or spatial relation information used by the requesting UE to transmit the initial request message or A-UL. In such embodiments, the gNB may transmit GC-DCI in neighboring beams.

In some embodiments, each AUL resource for a UE may be associated with an individual beam and/or panel (e.g., UL TCI-state information and/or spatial relation information). In such embodiments, a gNB may indicate via groupcast physical downlink control channel ("GC-PDCCH") at least a time-frequency resource grid and a bitfield to stop any UL transmissions on AUL resources overlapping with the time-frequency resource grid. Moreover, in such embodiments, a group of UEs, upon receiving a stop indication, may stop UL transmission on a CG resource in associated beams and/or panels in a remaining channel occupancy duration. In various embodiments, a UE transmits a request for information using multiple panels and/or beams before UL data transmission.

In various embodiments, a UE transmits a request message prior to A-UL data transmission using multiple beams and/or panels for which LBT is successful and, upon successful reception of the request message from any beam and/or panel, a gNB transmits a stop indicator in a GC-PDCCH for all UEs and/or UC-DCI to the requesting UE (e.g., the UC-DCI may be similar to a clear to send). In such embodiments, the request message may contain a UE ID, a CG resource configuration, a channel access priority class, a maximum channel occupancy time ("MCOT") duration, and/or a request for a stop indicator. In certain embodiments, a request message may be transmitted with in a physical uplink control channel ("PUCCH"), a physical uplink shared channel ("PUSCH"), a MAC CE, and/or an SRS like sequence.

In certain embodiments, gNB behavior may include receiving multiple duplicated request messages or AULs from a UE.

In some embodiments, a gNB may receive multiple request messages or A-ULs (e.g., on a plurality of spatial reception filters and/or receive beams) for the same transmission from multiple UE beams and/or panels for which LBT is successful and a behavior for the gNB may be defined for detecting a duplicated request for the same transmission and not transmitting more than one stop indicator and/or clear to send command for the same UE.

In various embodiments, a gNB checks from multiple request messages and/or A-UL transmissions whether it has the same UE RNTI and/or CG resource configuration. In such embodiments, the gNB decides to transmit only one stop indicator and/or clear to send command. In some embodiments, if a UE transmits an initial request using A-UL using different CG resources, then the gNB checks a UE RNTI, a channel access priority class, an MCOT duration, and/or a size of the CG resource to decide whether to transmit only one or to transmit multiple (e.g., associated with different CG resources) stop indicators and/or clear to send commands.

In certain embodiments, if a request message is based on a sequence, a UE may request to use the same sequence using multiple beams and/or panels for the same transmission. In such embodiments, a gNB may check whether received sequences from all received beams and/or panels are all same. If the gNB determines that sequences from all received beams and/or panels are the same, the gNB implies repetition and/or duplication, otherwise the UE requests different transmissions.

In various embodiments described herein, benefits may include avoiding interference of PUSCH data by a gNB. Moreover, UEs and gNBs may collaborate to select a best UE transmit ("TX") panel and/or beam that facilitates free-of-interference UL data reception for a requesting UE and muting other UL transmissions for requested CG resources.

In some embodiments, an antenna port may be defined such that a channel over which a symbol on the antenna port is conveyed may be inferred from the channel over which another symbol on the same antenna port is conveyed.

In certain embodiments, two antenna ports are said to be quasi co-located ("QCL") if large-scale properties of a channel over which a symbol on one antenna port is conveyed may be inferred from the channel over which a symbol on another antenna port is conveyed. Large-scale properties may include one or more of delay spread, Doppler spread, Doppler shift, average gain, average delay, and/or spatial receive ("RX") parameters. Two antenna ports may be quasi co-located with respect to a subset of the large-scale properties and different subset of large-scale properties may be indicated by a QCL Type. For example, a qcl-Type may take one of the following values: 1) 'QCL-TypeA': {Doppler shift, Doppler spread, average delay, delay spread}; 2) 'QCL-TypeB': {Doppler shift, Doppler spread}; 3) 'QCL-TypeC': {Doppler shift, average delay}; and 4) 'QCL-TypeD': {Spatial Rx parameter}.

In various embodiments, RX parameters may include one or more of: angle of arrival ("AoA"), dominant AoA, average AoA, angular spread, power angular spectrum ("PAS") of AoA, average angle of departure ("AoD"), PAS of AoD, transmit and/or receive channel correlation, transmit and/or receive beamforming, and/or spatial channel correlation.

In some embodiments, an "antenna port" may be a logical port that may correspond to a beam (e.g., resulting from beamforming) or may correspond to a physical antenna on a device. In certain embodiments, a physical antenna may map directly to a single antenna port in which an antenna port corresponds to an actual physical antenna. In various embodiments, a set of physical antennas, a subset of physical antennas, an antenna set, an antenna array, or an antenna sub-array may be mapped to one or more antenna ports after applying complex weights and/or a cyclic delay to the signal on each physical antenna. The physical antenna set may have antennas from a single module or panel or from multiple modules or panels. The weights may be fixed as in an antenna virtualization scheme, such as cyclic delay diversity ("CDD"). A procedure used to derive antenna ports from physical antennas may be specific to a device implementation and transparent to other devices.

In some embodiments, a UE antenna panel may be a physical or logical antenna array including a set of antenna elements or antenna ports that share a common or a significant portion of a radio frequency ("RF") chain (e.g., in-phase and/or quadrature ("I/Q") modulator, analog to digital ("A/D") converter, local oscillator, phase shift network). The UE antenna panel or UE panel may be a logical entity with physical UE antennas mapped to the logical entity. The mapping of physical UE antennas to the logical entity may be up to UE implementation. Communicating (e.g., receiving or transmitting) on at least a subset of antenna elements or antenna ports active for radiating energy (e.g., active elements) of an antenna panel may require biasing or powering on of an RF chain which results in current drain or power consumption in a UE associated with the antenna panel (e.g., including power amplifier and/or low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In certain embodiments, depending on a UE's own implementation, a "UE panel" may have at least one of the following functionalities as an operational role of unit of antenna group to control its TX beam independently, unit of antenna group to control its transmission power independently, and/pr unit of antenna group to control its transmission timing independently. The "UE panel" may be transparent to a gNB. For certain conditions, a gNB or network may assume that a mapping between a UE's physical antennas to the logical entity "UE panel" may not be changed. For example, a condition may include until the next update or report from UE or include a duration of time over which the gNB assumes there will be no change to mapping. A UE may report its UE capability with respect to the "UE panel" to the gNB or network. The UE capability may include at least the number of "UE panels." In one embodiment, a UE may support UL transmission from one beam within a panel. With multiple panels, more than one beam (e.g., one beam per panel) may be used for UL transmission. In another embodiment, more than one beam per panel may be supported and/or used for UL transmission.

In various embodiments, a transmission configuration indicator ("TCI") state associated with a target transmission may indicate a quasi-collocation relationship between a target transmission (e.g., target RS of demodulation reference signal ("DM-RS") ports of the target transmission during a transmission occasion) and source reference signals (e.g., synchronization signal block ("SSB"), channel state information reference signal ("CSI-RS"), and/or sounding reference signal ("SRS")) with respect to quasi co-location type parameters indicated in a corresponding TCI state.

In some embodiments, spatial relation information associated with a target transmission may indicate a spatial setting between a target transmission and a reference RS (e.g., SSB, CSI-RS, and/or SRS). For example, a UE may transmit a target transmission with the same spatial domain filter used for receiving a reference RS (e.g., DL RS such as SSB and/or CSI-RS). In another example, a UE may transmit a target transmission with the same spatial domain transmission filter used for the transmission of a RS (e.g., UL RS such as SRS).

FIG. 5 is a flow chart diagram illustrating one embodiment of a method 500 for using a stop indication for physical uplink shared channel transmission. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

In various embodiments, the method 500 includes transmitting 502 a physical uplink shared channel transmission in an autonomous uplink configured grant resource after performing a listen-before-talk procedure. In various embodiments, the method 500 includes receiving 504 a stop indication in response to transmitting the physical uplink shared channel transmission, wherein the stop indication indicates for a group of user equipments not to transmit in an overlapped configured grant resource for a period of time corresponding to a spatial filter.

In certain embodiments, the method 500 further comprises receiving information indicating a clear to send command for a user equipment not part of the group of user equipments. In some embodiments, the clear to send command indicates for the user equipment to transmit in the overlapped configured grant resource for the period of time corresponding to the spatial filter.

In various embodiments, the information indicating the clear to send command comprises a user equipment identifier transmitted in groupcast downlink control information together with the stop indication. In one embodiment, the information indicating the clear to send command comprises an indicator transmitted in unicast downlink control information. In certain embodiments, the stop indication is transmitted using a group common physical downlink control channel with a configured radio network temporary identifier.

In some embodiments, the method 500 further comprises starting a timer in response to transmitting the physical uplink shared channel transmission. In various embodiments, the method 500 further comprises stopping the timer in response to receiving the stop indication. In one embodiment, the method 500 further comprises, in response to expiration of the timer prior to receiving the stop indication, transmitting a new transport block in the autonomous uplink configured grant resource.

FIG. 6 is a flow chart diagram illustrating another embodiment of a method 600 for using a stop indication for physical uplink shared channel transmission. In some embodiments, the method 600 is performed by an apparatus, such as the network unit 104. In certain embodiments, the method 600 may be performed by a processor executing program code, for example, a microcontroller, a microprocessor, a CPU, a GPU, an auxiliary processing unit, a FPGA, or the like.

In various embodiments, the method 600 includes receiving 602 a physical uplink shared channel transmission in an autonomous uplink configured grant resource. In various embodiments, the method 600 includes transmitting 604 a stop indication in response to receiving the physical uplink shared channel transmission, wherein the stop indication indicates for a group of user equipments not to transmit in an overlapped configured grant resource for a period of time corresponding to a spatial filter.

In certain embodiments, the method 600 further comprises transmitting information indicating a clear to send command for a user equipment not part of the group of user equipments. In some embodiments, the clear to send command indicates for the user equipment to transmit in the overlapped configured grant resource for the period of time corresponding to the spatial filter.

In various embodiments, the information indicating the clear to send command comprises a user equipment identifier transmitted in groupcast downlink control information together with the stop indication. In one embodiment, the information indicating the clear to send command comprises an indicator transmitted in unicast downlink control information. In certain embodiments, the stop indication is transmitted using a group common physical downlink control channel with a configured radio network temporary identifier.

In some embodiments, the method 600 further comprises transmitting information indicating a radio network temporary identifier for monitoring group common downlink control information. In various embodiments, a cyclic redundancy checksum of the group common downlink control information is masked with the radio network temporary identifier. In one embodiment, the group common downlink control information indicates multiple cancel indicators, muting indicators, clear-to send indicators, or some combination thereof.

In one embodiment, a method comprises: transmitting a physical uplink shared channel transmission in an autonomous uplink configured grant resource after performing a listen-before-talk procedure; and receiving a stop indication in response to transmitting the physical uplink shared channel transmission, wherein the stop indication indicates for a group of user equipments not to transmit in an overlapped configured grant resource for a period of time corresponding to a spatial filter.

In certain embodiments, the method further comprises receiving information indicating a clear to send command for a user equipment not part of the group of user equipments.

In some embodiments, the clear to send command indicates for the user equipment to transmit in the overlapped configured grant resource for the period of time corresponding to the spatial filter.

In various embodiments, the information indicating the clear to send command comprises a user equipment identifier transmitted in groupcast downlink control information together with the stop indication.

In one embodiment, the information indicating the clear to send command comprises an indicator transmitted in unicast downlink control information.

In certain embodiments, the stop indication is transmitted using a group common physical downlink control channel with a configured radio network temporary identifier.

In some embodiments, the method further comprises starting a timer in response to transmitting the physical uplink shared channel transmission.

In various embodiments, the method further comprises stopping the timer in response to receiving the stop indication.

In one embodiment, the method further comprises, in response to expiration of the timer prior to receiving the stop indication, transmitting a new transport block in the autonomous uplink configured grant resource.

In one embodiment, an apparatus comprises: a transmitter that transmits a physical uplink shared channel transmission in an autonomous uplink configured grant resource after performing a listen-before-talk procedure; and a receiver that receives a stop indication in response to transmitting the physical uplink shared channel transmission, wherein the stop indication indicates for a group of user equipments not to transmit in an overlapped configured grant resource for a period of time corresponding to a spatial filter.

In certain embodiments, the receiver receives information indicating a clear to send command for a user equipment not part of the group of user equipments.

In some embodiments, the clear to send command indicates for the user equipment to transmit in the overlapped configured grant resource for the period of time corresponding to the spatial filter.

In various embodiments, the information indicating the clear to send command comprises a user equipment identifier transmitted in groupcast downlink control information together with the stop indication.

In one embodiment, the information indicating the clear to send command comprises an indicator transmitted in unicast downlink control information.

In certain embodiments, the stop indication is transmitted using a group common physical downlink control channel with a configured radio network temporary identifier.

In some embodiments, the apparatus further comprises a processor that starts a timer in response to transmitting the physical uplink shared channel transmission.

In various embodiments, the processor stops the timer in response to receiving the stop indication.

In one embodiment, the transmitter, in response to expiration of the timer prior to receiving the stop indication, transmits a new transport block in the autonomous uplink configured grant resource.

In one embodiment, a method comprises: receiving a physical uplink shared channel transmission in an autonomous uplink configured grant resource; and transmitting a stop indication in response to receiving the physical uplink shared channel transmission, wherein the stop indication indicates for a group of user equipments not to transmit in an overlapped configured grant resource for a period of time corresponding to a spatial filter.

In certain embodiments, the method further comprises transmitting information indicating a clear to send command for a user equipment not part of the group of user equipments.

In some embodiments, the clear to send command indicates for the user equipment to transmit in the overlapped configured grant resource for the period of time corresponding to the spatial filter.

In various embodiments, the information indicating the clear to send command comprises a user equipment identifier transmitted in groupcast downlink control information together with the stop indication.

In one embodiment, the information indicating the clear to send command comprises an indicator transmitted in unicast downlink control information.

In certain embodiments, the stop indication is transmitted using a group common physical downlink control channel with a configured radio network temporary identifier.

In some embodiments, the method further comprises transmitting information indicating a radio network temporary identifier for monitoring group common downlink control information.

In various embodiments, a cyclic redundancy checksum of the group common downlink control information is masked with the radio network temporary identifier.

In one embodiment, the group common downlink control information indicates multiple cancel indicators, muting indicators, clear-to send indicators, or some combination thereof.

In one embodiment, an apparatus comprises: a receiver that receives a physical uplink shared channel transmission in an autonomous uplink configured grant resource; and a transmitter that transmits a stop indication in response to receiving the physical uplink shared channel transmission, wherein the stop indication indicates for a group of user equipments not to transmit in an overlapped configured grant resource for a period of time corresponding to a spatial filter.

In certain embodiments, the transmitter transmits information indicating a clear to send command for a user equipment not part of the group of user equipments.

In some embodiments, the clear to send command indicates for the user equipment to transmit in the overlapped configured grant resource for the period of time corresponding to the spatial filter.

In various embodiments, the information indicating the clear to send command comprises a user equipment identifier transmitted in groupcast downlink control information together with the stop indication.

In one embodiment, the information indicating the clear to send command comprises an indicator transmitted in unicast downlink control information.

In certain embodiments, the stop indication is transmitted using a group common physical downlink control channel with a configured radio network temporary identifier.

In some embodiments, the transmitter transmits information indicating a radio network temporary identifier for monitoring group common downlink control information.

In various embodiments, a cyclic redundancy checksum of the group common downlink control information is masked with the radio network temporary identifier.

In one embodiment, the group common downlink control information indicates multiple cancel indicators, muting indicators, clear-to send indicators, or some combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:

transmitting, to a base station, a physical uplink shared channel (PUSCH) transmission in an autonomous uplink configured grant resource after a listen-before-talk (LBT) procedure being successful; and receiving a stop indication from the base station in response to transmitting the PUSCH transmission, wherein the stop indication indicates that a group of UEs are not to transmit in an overlapped configured grant resource for a period of time corresponding to a spatial filter.

2. The method of claim 1, further comprising receiving information indicating a clear to send command for a UE not part of the group of UEs.

3. The method of claim 2, wherein the clear to send command indicates for the UE to transmit in the overlapped configured grant resource for the period of time corresponding to the spatial filter.

4. The method of claim 2, wherein the information indicating the clear to send command comprises a UE identifier transmitted in groupcast downlink control information (DCI) together with the stop indication.

5. The method of claim 2, wherein the information indicating the clear to send command comprises an indicator transmitted in unicast downlink control information (DCI).

6. The method of claim 1, wherein the stop indication is transmitted using a group common physical downlink control channel (PDCCH) with a configured radio network temporary identifier (RNTI).

7. The method of claim 1, further comprising starting a timer in response to transmitting the PUSCH transmission.

8. The method of claim 7, further comprising stopping the timer in response to receiving the stop indication.

9. The method of claim 7, further comprising, in response to expiration of the timer prior to receiving the stop indication, transmitting a new transport block (TB) in the autonomous uplink configured grant resource.

10. A user equipment (UE), comprising:

at least one memory; and at least one processor coupled with the at least one memory and configured to cause the UE to:

transmit, to a base station, a physical uplink shared channel (PUSCH) transmission in an autonomous uplink configured grant resource after a listen-before-talk (LBT) procedure being successful; and receive a stop indication from the base station in response to transmitting the PUSCH transmission, wherein the stop indication indicates that a group of UEs are not to transmit in an overlapped configured grant resource for a period of time corresponding to a spatial filter.

11. The UE of claim 10, wherein the at least one processor is configured to cause the UE to receive information indicating a clear to send command for a UE not part of the group of UEs.

12. A base station, comprising:

at least one memory; and at least one processor coupled with the at least one memory and configured to cause the base station to:

receive a physical uplink shared channel (PUSCH) transmission in an autonomous uplink configured grant resource from a user equipment (UE) after a listen-before-talk (LBT) procedure is successfully performed by the UE; and transmit a stop indication to the UE in response to receiving the PUSCH transmission, wherein the stop indication indicates that a group of UEs are not to transmit in an overlapped configured grant resource for a period of time corresponding to a spatial filter.

13. The base station of claim 12, wherein the at least one processor is configured to cause the base station to transmit information indicating a clear to send command for a UE not part of the group of UEs.

14. The base station of claim 13, wherein the clear to send command indicates for the UE to transmit in the overlapped configured grant resource for the period of time corresponding to the spatial filter.

15. The base station of claim 13, wherein the information indicating the clear to send command comprises a UE identifier transmitted in groupcast downlink control information (DCI) together with the stop indication.

16. The base station of claim 13, wherein the information indicating the clear to send command comprises an indicator transmitted in unicast downlink control information (DCI).

17. The base station of claim 12, wherein the stop indication is transmitted using a group common physical downlink control channel (PDCCH) with a configured radio network temporary identifier (RNTI).

18. The base station of claim 12, wherein the at least one processor is configured to cause the base station to transmit information indicating a radio network temporary identifier (RNTI) for monitoring group common downlink control information (DCI).

19. The base station of claim 18, wherein a cyclic redundancy checksum (CRC) of the group common DCI is masked with the RNTI.

20. The base station of claim 18, wherein the group common DCI indicates multiple cancel indicators, muting indicators, or clear-to send indicators, or a combination thereof.

\* \* \* \* \*